(12) United States Patent
Yamamoto (10) Patent No.: US 8,277,598 B2
(45) Date of Patent: Oct. 2, 2012

(54) DISPLAY MANUFACTURING METHOD

(75) Inventor: Kentaro Yamamoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 65 days.

(21) Appl. No.: 13/020,734

(22) Filed: Feb. 3, 2011

(65) Prior Publication Data

US 2011/0195630 A1    Aug. 11, 2011

(30) Foreign Application Priority Data

Feb. 9, 2010    (JP) .................................. 2010-026210

(51) Int. Cl.
*C03C 27/12* (2006.01)

(52) U.S. Cl. ............ 156/295; 156/87; 156/99; 156/102; 156/103

(58) Field of Classification Search .................. 156/295, 156/87, 99, 102, 103
See application file for complete search history.

(56) References Cited

FOREIGN PATENT DOCUMENTS

| | | | |
|---|---|---|---|
| JP | 07126046 A | * | 5/1995 |
| JP | 2000-053453 A | | 2/2000 |

OTHER PUBLICATIONS

Machine translation of publication No. 07-126046 ; pub date: May 6, 1995, "Method for bonding resin material to curved glass" ; Applicant: Central Glass Co. LTD.; inventors: Hirugawa et al., translation date unknown.*

* cited by examiner

*Primary Examiner* — Jeff Aftergut
*Assistant Examiner* — Jaeyun Lee
(74) *Attorney, Agent, or Firm* — Canon USA, Inc., IP Division

(57) ABSTRACT

In a method for manufacturing a display including a light-transmissive substrate bonded onto a display surface of a display body, a bonding surface of the display body and a bonding surface of the light-transmissive substrate are set in a mutually opposed manner across compression-deformable clearance regulation members. The compression-deformable clearance regulation members are provided between the display body and the light-transmissive substrate. An adhesive, previously applied to one terminal edge of a bonding surface, is spread between the bonding surfaces of both the display body and the light-transmissive substrate. This is done by pressing the light-transmissive substrate against the display body starting from one terminal edge towards an other terminal edge thereof and by gradually decreasing a clearance between the bonding surfaces by serially compression-deforming the clearance regulation member from the one terminal edge towards the other terminal edge.

15 Claims, 6 Drawing Sheets

DISPLAY MANUFACTURING METHOD

BACKGROUND OF THE INVENTION

1. Field of the Invention

The present invention relates to a display manufacturing method. In particular, the present invention relates to a method for manufacturing a display to whose outer surface, a light-transmissive substrate is bonded to improve the anti-shock property and a display performance of the display.

2. Description of the Related Art

Japanese Patent Application Laid-Open No. 2000-053453 discusses a method for bonding a light-transmissive substrate (thin sheet glass) on an outer surface of a display body to improve the anti-shock property and the display performance of the display. In this conventional method, at first, an adhesive is applied to either one of the display surface of the display body and the light-transmissive substrate. Furthermore, the light-transmissive substrate is bent to have a shape convex towards the display surface of the display body. Then the light-transmissive substrate is subjected to pressure by a roller from one side to the opposing other side thereof to be gradually bonded.

More specifically, in the method discussed in Japanese Patent Application Laid-Open No. 2000-053453, a light-transmissive substrate is suctioned to a multiple of shade-like shaped bonding jigs, which are combined together in parallel to one another, in order to bend the entire long slender suction member, which is combined with a suction unit. Furthermore, in this conventional method, the bonding jig is bent together with the light-transmissive substrate using the roller to bond the light-transmissive substrate.

However, in the method discussed in Japanese Patent Application Laid-Open No. 2000-053453, as the size of a display surface of a display body gets larger, it becomes necessary to provide a large-size bonding jig to securely suction the large-size light-transmissive substrate. Therefore, the burden of facilities may become heavy.

In addition, a gap (i.e., the thickness of an adhesive layer) between the display surface of the display body and the light-transmissive substrate may be adjusted by a pressure from a roller. However, if the display surface has a size as large as forty inches (i.e., as large as one meter or greater by the diagonal dimension), it is not easy to apply uniform pressure on the entire surface. Accordingly, the accuracy of bonding may degrade.

SUMMARY OF THE INVENTION

An embodiment provides a method for manufacturing a display including a light-transmissive substrate bonded onto a display surface of a display body. A bonding surface of the display body and a bonding surface of the light-transmissive substrate are set in a mutually opposed manner across compression-deformable clearance regulation members. The compression-deformable clearance regulation members are provided between the display body and the light-transmissive substrate on both side edges of each of the display body and the light-transmissive substrate with a predetermined clearance. An adhesive, previously applied to one terminal edge of at least one of the bonding surface of the display body and the bonding surface of the light-transmissive substrate, is spread between the bonding surfaces of both the display body and the light-transmissive substrate. This is done by pressing the light-transmissive substrate against the display body starting from one terminal edge towards an other terminal edge thereof and by gradually decreasing a clearance between the bonding surfaces by serially compression-deforming the clearance regulation member from the one terminal edge towards the other terminal edge.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

DESCRIPTION OF THE EMBODIMENTS

Various exemplary embodiments, features, and aspects of the invention will be described in detail below with reference to the drawings.

The embodiments provide a display manufacturing method used in manufacturing a large size display, which includes bonding processing enabling bonding of a light-transmissive substrate onto a bonding surface with simple equipments while maintaining a high accuracy of thickness control of an adhesive sandwiched between a display surface of the display body and the light-transmissive substrate.

In the embodiments, the gap (the thickness of the adhesive layer) between both bonding surfaces sandwiching the adhesive therebetween is determined according to the thickness of the clearance regulation member after being pressed and compression-deformed. Accordingly, if the light-transmissive substrate or the retaining member is pressed by the pressing force for pressing and compression-deforming the clearance regulation member to a predetermined thickness, the gap can be controlled, by the clearance regulation member that is compression-deformed to the predetermined thickness, to be constant.

Once a material is compression-deformed by a specific amount, the material may not be further compression-deformed even if the pressing force is increased. Therefore, the gap can be controlled to be constant if the clearance regulation member is pressed with the pressing force around which the amount of the compression-deformation will not vary. In other words, the amount of the compression-deformation will not change when the pressing force is increased, even if the amount of the pressing force to be applied varies in some degree.

In the embodiments, the gap between both bonding surfaces can be gradually reduced by gradually compression-deforming the clearance regulation member from one terminal edge to the other terminal edge. Accordingly, the embodiments can spread out the adhesive between both bonding surfaces while squeezing out the air existing between both bonding surfaces.

The embodiments can manufacture a large-size flat-panel display by extending the range (the length) of providing the clearance regulation member. Accordingly, in the embodiments the light-transmissive substrate can be bonded onto the display surface of the display body by simple equipments.

In the embodiments, a "terminal edge" of the display body or the light-transmissive substrate refers to one terminal side of the display body or the light-transmissive substrate which forms a rectangular plane. In addition, a "side edge" refers to a side of the display body or the light-transmissive substrate perpendicular to the terminal edge.

In addition, the embodiments are useful in manufacturing a flat-panel display including a panel, such as an electron beam display panel, a liquid crystal display (LCD) panel, an electroluminescence (EL) display panel, or a plasma display panel. Moreover, the embodiments are not limited to manufacture of the above-described display. More specifically, the embodiments can also be useful in manufacturing a cathode ray tube (CRT) display.

In the embodiments, in manufacturing a flat-panel display, the "display body" refers to a panel constituting a display screen. On the other hand, in a case of manufacturing a CRT display, the "display body" refers to a CRT.

Now, bonding processing, which is executed by the display manufacturing method according to a first exemplary embodiment embodiments, will be described in detail below with reference to FIGS. 1A and 1B, 2A through 2D, 3A through 3F, and 4A through 4F.

Figure 1A:
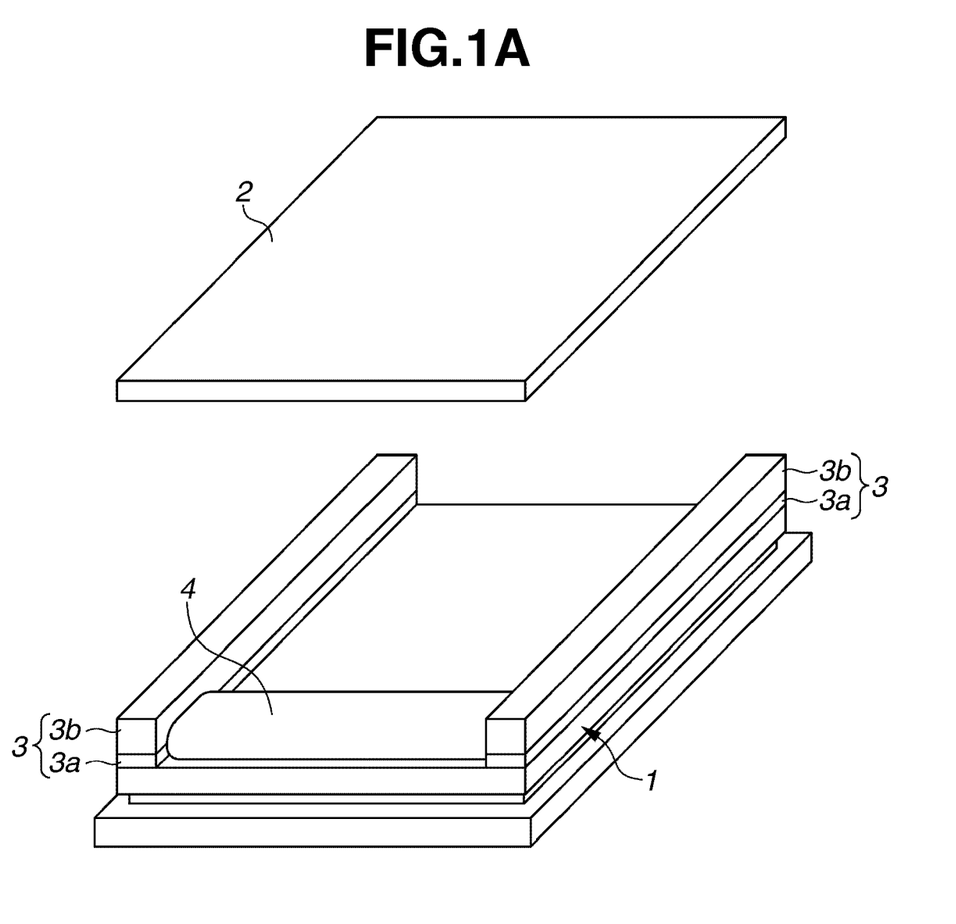
FIGS. 1A and 1B schematically illustrate a method of arranging a display body, a light-transmissive substrate, and clearance regulation members during bonding processing executed by a display manufacturing method according to a first exemplary embodiment.
Figure 1B:
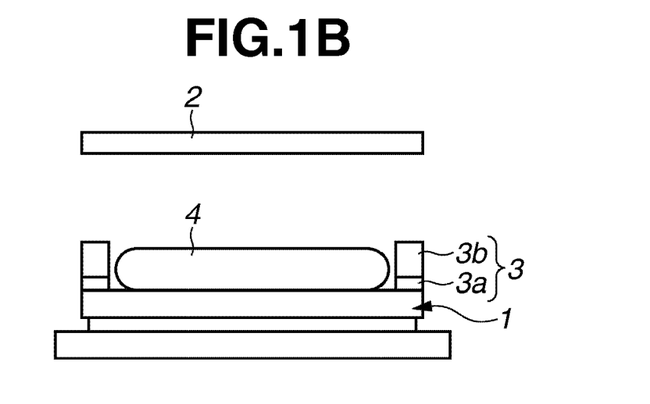

Referring to FIGS. 1A and 1B, FIG. 1B schematically illustrates the state illustrated in FIG. 1A viewed from one terminal end of the light-transmissive substrate 2.

Figure 2A:
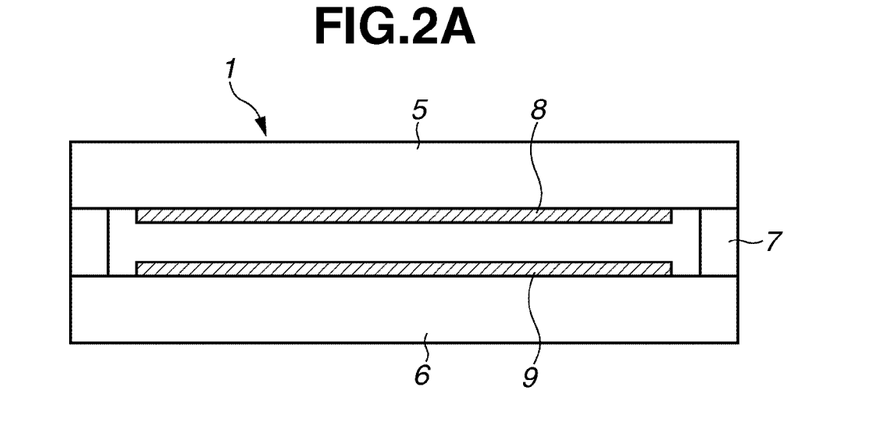
FIGS. 2A through 2D are schematic cross sections of the display body and the light-transmissive substrate.
Figure 2B:
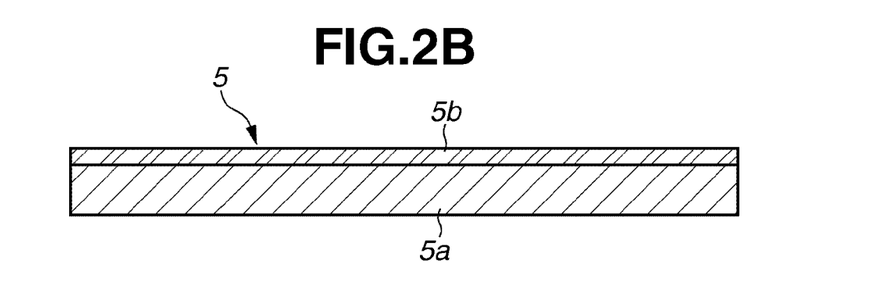
Figure 2C:
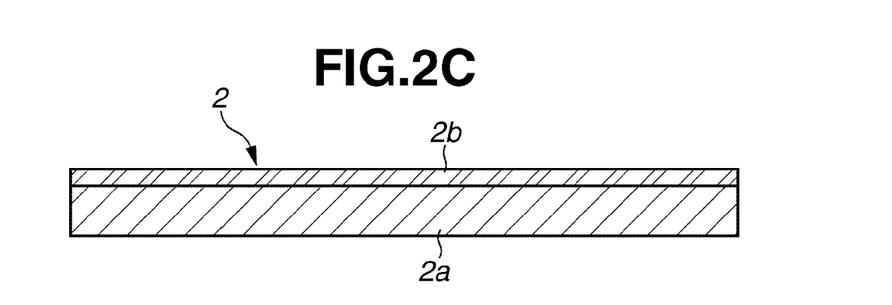
Figure 2D:
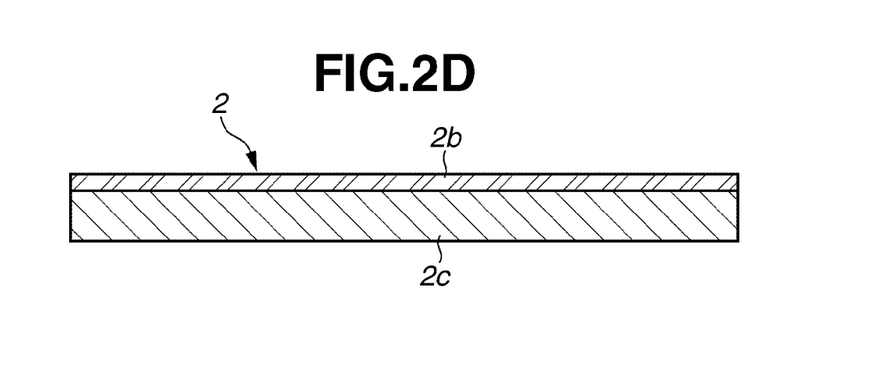

FIG. 2A illustrates the entire display body 1. FIG. 2B illustrates an example of a display substrate, which constitutes a display surface of the display body. FIGS. 2C and 2D illustrate an example of a light-transmissive substrate.

Figure 3A:
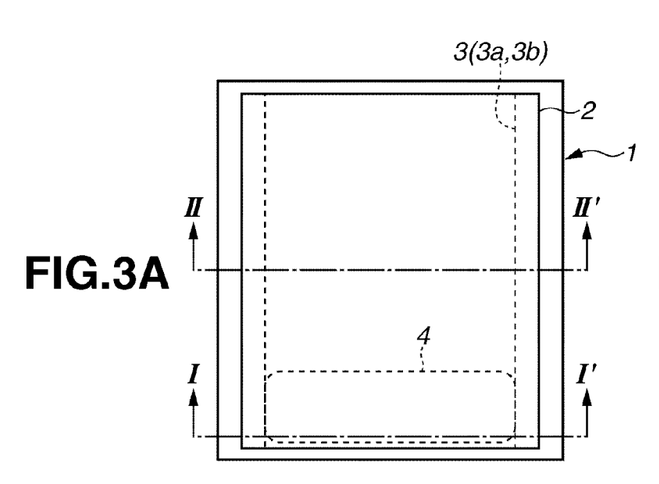
FIGS. 3A through 3F illustrate each processing of bonding processing according to the first exemplary embodiment.
Figure 3B:
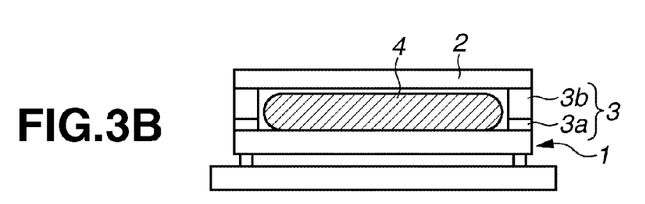
Figure 3C:
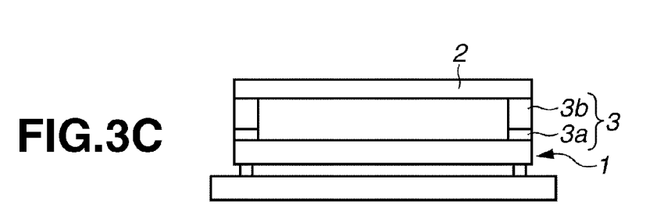
Figure 3D:
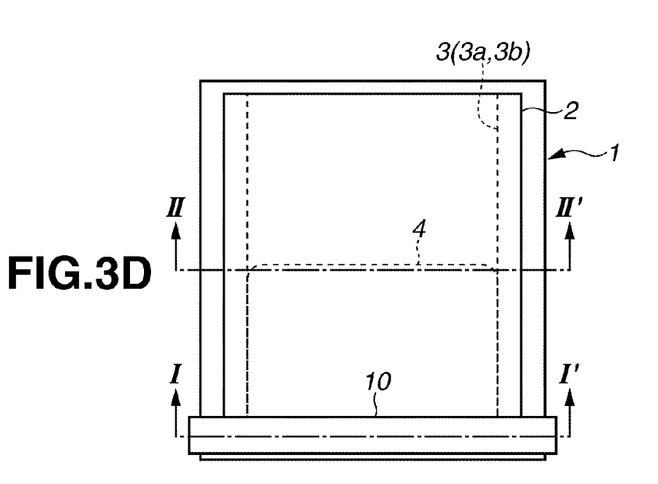
Figure 3E:
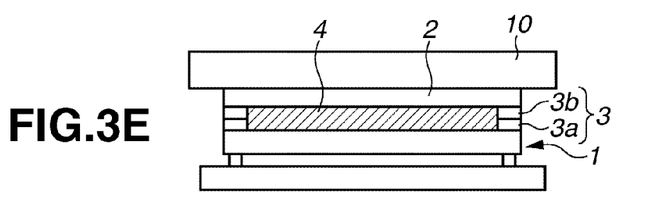
Figure 3F:
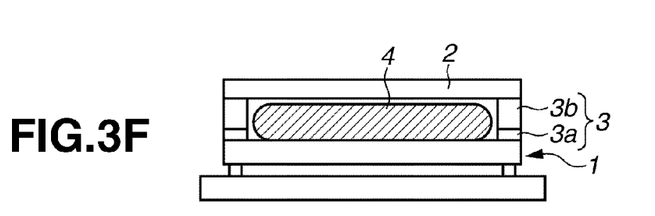

FIG. 3A is a plan view schematically illustrating a state before pressing is started. FIG. 3B is a schematic cross section I-I' of the example illustrated in FIG. 3A. FIG. 3C is a schematic cross section II-II' of the example illustrated in FIG. 3A. FIG. 3D is a plan view schematically illustrating a state immediately after the pressing is started. FIG. 3E is a schematic cross section I-I' of the example illustrated in FIG. 3D. FIG. 3F is a schematic cross section II-II' of the example illustrated in FIG. 3D.

Figure 4A:
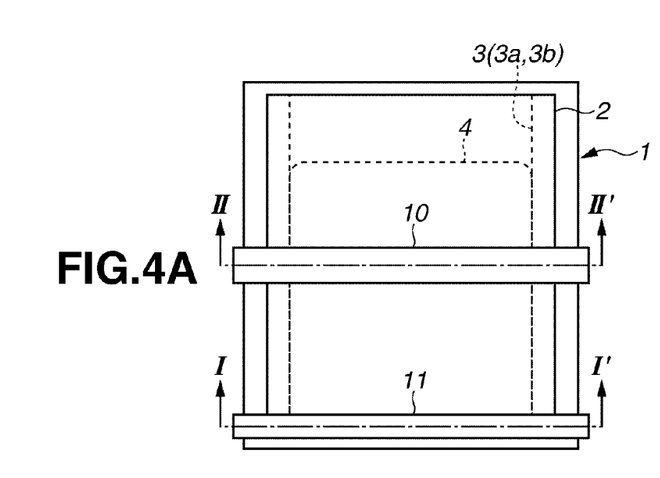
FIGS. 4A through 4F illustrate each processing of bonding processing according to the first exemplary embodiment.
Figure 4B:
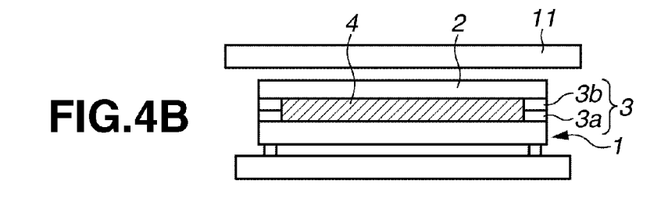
Figure 4C:
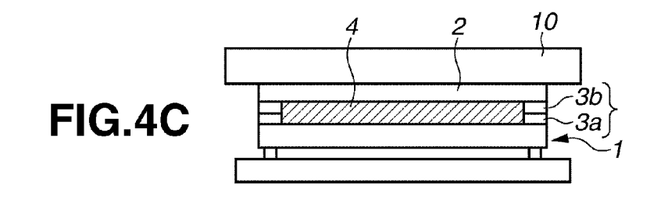
Figure 4D:
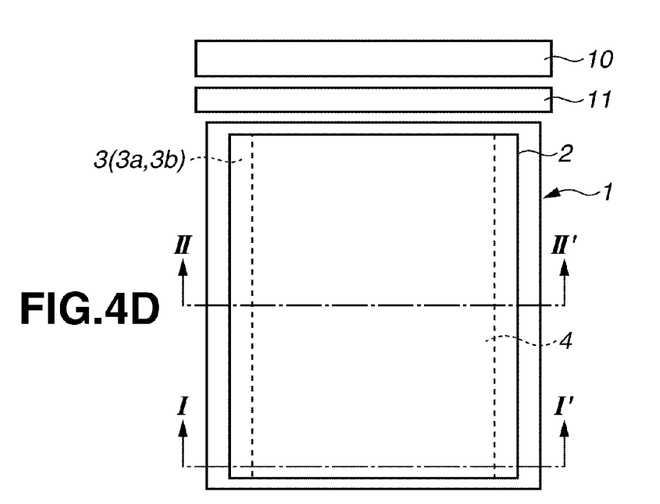
Figure 4E:
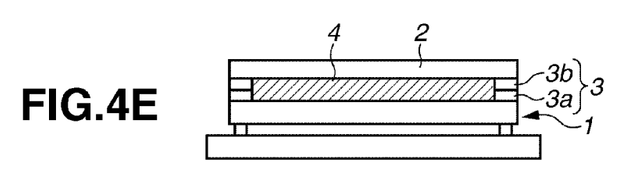
Figure 4F:
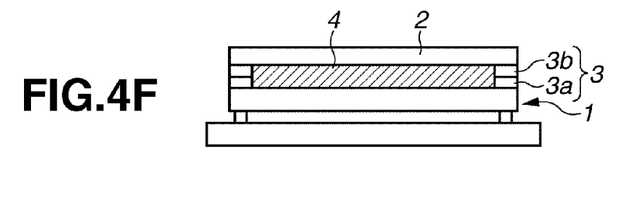

FIG. 4A is a plan view schematically illustrating a state in which pressing has been executed to an intermediate point. FIG. 4B is a schematic cross section I-I' of the example illustrated in FIG. 4A. FIG. 4C is a schematic cross section II-II' of the example illustrated in FIG. 4A. FIG. 4D is a plan view schematically illustrating a state after the pressing and curing processing have been completed. FIG. 4E is a schematic cross section I-I' of the example illustrated in FIG. 4D. FIG. 4F is a schematic cross section II-II' of the example illustrated in FIG. 4D.

Referring to FIGS. 1A and 1B, a display body 1, a light-transmissive substrate 2, and clearance regulation members 3, which include a non-deformable member 3a and a deformable member 3b, are to be bonded together via an adhesive 4.

Referring to FIG. 2A, the display body 1 includes a display substrate 5, which constitutes a display surface, a back substrate 6, which constitutes a back surface, and a frame member 7, which constitutes a hermetic chamber together with the display substrate 5 and the back substrate 6.

In addition, an image display unit is provided in the hermetic chamber. In the case of manufacturing an electron beam display panel, the image display unit includes a phosphor 8, which is provided on the display substrate 5, and an electron source 9, which is provided on the back substrate 6.

Although not illustrated in the drawing, in manufacturing an LCD panel, the image display unit includes a liquid crystal, a transistor, and an electrode. On the other hand, in manufacturing an EL display panel, the image display unit includes an EL cell. Furthermore, in manufacturing a plasma display panel, the image display unit includes a phosphor, plasma generation gas, and an electrode.

Referring to FIG. 2B, the display substrate 5, which constitutes the display surface of the display body 1, can include a transparent glass 5a and a light-transmissive resin film. 5b, which is bonded on the surface of the transparent glass 5a. Alternatively, the display substrate 5 can include the transparent glass 5a only. The light-transmissive resin film 5b includes a resin film having a function of a charge restriction, a light reflection, or a color filtering.

The light-transmissive substrate 2 is bonded on the outer surface of the display surface of the display body 1. As illustrated in FIGS. 2C and 2D, the light-transmissive substrate 2 includes a transparent glass 2a or a transparent resin substrate 2c and a light-transmissive resin film 2b, which is bonded on the transparent glass 2a or the transparent resin substrate 2c. Alternatively, the light-transmissive substrate 2 can include the transparent glass 2a or the transparent resin substrate 2c only.

Similar to the above-described light-transmissive resin film 5b, the light-transmissive resin film 2b is a resin film having a function of a charge restriction, a light reflection, or a color filtering. If the light-transmissive resin film 5b is provided in the display substrate 5 of the display body 1, a film having a function different from the function of the light-transmissive resin film 5b is used as the light-transmissive resin film 2b. However, a film having the same function as the function of the light-transmissive resin film 5b can be used as the light-transmissive resin film 2b.

In order to improve the anti-shock property of the display body 1, it is useful if the light-transmissive substrate 2 includes the transparent or the transparent glass 2a and the light-transmissive resin film 2b, which is bonded on the surface of the transparent glass 2a.

In the usual case, bonding processing is executed in a state in which the display body 1 is set on a stage (not illustrated). The display body 1 is set on the stage with its display surface, which is the bonding surface, facing up. In addition, usually, the bonding surface of the display body 1, which is the display surface, is subjected to pretreatment of washing the surface using an organic solvent, such as acetone, before or after setting the display body 1 on the stage.

Referring to FIGS. 1A and 1B and FIGS. 3A through 3C, the display body 1 and the light-transmissive substrate 2 are stacked with sandwiching the clearance regulation members 3 therebetween. The clearance regulation members 3 are provided at both side edges of each of the display body 1 and the light-transmissive substrate 2. Furthermore, the light-transmissive substrate 2 is mounted on the display body 1 from above the display body 1 via the clearance regulation members 3 in a state where the bonding surface of the light-transmissive substrate 2 faces down.

In this manner, the bonding surface of the display body 1 and bonding surface of the light-transmissive substrate 2 are opposed to each other via a clearance. Usually, since the workability of the operation is excellent, the clearance regulation members 3 is placed and bonded on the display body 1, which has been set on the stage, at both side edges of the display body and then the light-transmissive substrate 2 is mounted on the clearance regulation members 3.

However, the embodiments are not limited to this. More specifically, the clearance regulation members 3 may be placed and bonded on the light-transmissive substrate 2 at both side edges thereof and then the light-transmissive substrate 2 may be mounted on the display body 1 with the surface on which the clearance regulation members 3 are bonded facing downwards.

The clearance regulation members 3 can be compression-deformed in the mutually opposing direction of the display body 1 and the light-transmissive substrate 2. In the present exemplary embodiment, the clearance regulation members 3 includes two layers, which include a non-deformable member 3a and a deformable member 3b. More specifically, the deformable member 3b can be compression-deformed by applying pressing force thereto while the non-deformable member 3a cannot be compression-deformed if pressing force is applied. An exemplary method for applying the pressing force will be described in detail below.

The non-deformable member 3a and deformable member 3b are laminated together in the mutually opposing direction of the display body 1 and the light-transmissive substrate 2, i.e., in the direction of the compression-deformation of the clearance regulation members 3.

For the non-deformable member 3a, a material having a high elastic ratio and whose thickness cannot easily be deformed, such as a sheet of a resin including polyethylene terephthalate (PET), a sheet of a metal material, a tape, or a film can be used. In particular, a PET film can be used as the non-deformable member 3a. On the other hand, for the deformable member 3b, an elastically deformable material or a plastically deformable material can be used. In particular, various deformable materials, such as a sponge or styrofoam, can be used as the deformable member 3b.

The non-deformable member 3a and the deformable member 3b can be laminated and bonded together when the resulting clearance regulation members 3 are mounted on the display body 1 or the light-transmissive substrate 2. Alternatively, the deformable member 3b and the non-deformable member 3a can be previously laminated and bonded together and then bonded to the display body 1 or the light-transmissive substrate 2.

In addition, in order to regulate the potential of the surface of the display body 1 when the clearance regulation members 3 are mounted onto the clearance regulation members 3, a conductive material can be used as the material of the clearance regulation members 3. Furthermore, instead of providing contiguous stick-like shaped members along the side edges of the display body 1 or the light-transmissive substrate 2 as the clearance regulation members 3, a plurality of short pieces, each of which is shorter than the length of the side edge of the display body 1 or the light-transmissive substrate 2, can be provided discontiguously along the side edges of the display body 1 or the light-transmissive substrate 2.

In particular, as the clearance regulation member 3, it is useful to provide a member whose total length is substantially equivalent to the length of the side edges or the display body 1 or the light-transmissive substrate 2 substantially along the length of the side edges of the display body 1 or the light-transmissive substrate 2 in order to effectively prevent running of the adhesive 4 off the bonding surfaces, which may otherwise occur when the adhesive 4 is spread when the light-transmissive substrate 2 is pressed.

On the other hand, if a plurality of short pieces shorter than the length of the side edge of the display body 1 or the light-transmissive substrate 2 is provided discontiguously along the side edges of the display body 1 or the light-transmissive substrate 2, it is useful to serially and contiguously arrange the pieces.

Furthermore, it is useful if the width of the clearance regulation member 3 is as narrow as possible in order to secure a largest possible image display area. More specifically, the width of the clearance regulation member 3 can be set within the range in which the light-transmissive substrate 2 can be stably retained above the display body 1 and an appropriately high compression intensity can be achieved.

The thickness of the clearance regulation member 3 (i.e., the dimension of the clearance regulation member 3 in the mutually opposing direction of the display panel body 1 and the light-transmissive substrate 2) can be determined according to the thickness of the applied adhesive 4 and the total thickness of the deformable member 3b after being compression-deformed by the applied pressure. The thickness of the applied adhesive 4 and the total thickness of the deformable member 3b after compression-deformation by the pressure will be described in detail below.

To paraphrase this, for the thickness of the clearance regulation member 3, the thickness, with which the bonding surface of the light-transmissive substrate 2 does not contact the adhesive 4 when the display body 1 and the light-transmissive substrate 2 are merely set on the stage (i.e., before the light-transmissive substrate 2 is pressed towards the display body 1) across the clearance regulation member 3, can be selected.

This configuration is useful because if this configuration is employed, it can be effectively prevented that when the display body 1 and the light-transmissive substrate 2 are set opposed to each other and mounted together, the bonding surface different from the other bonding surface on which the adhesive 4 is applied may adversely contact the adhesive 4 and cause the adhesive 4 to contain air bubbles.

In addition, the thickness of the clearance regulation member 3 is adjusted to regulate the total thickness of the clearance regulation member 3 after the deformable member 3b is compression-deformed so that the total thickness becomes equivalent to a predetermined gap between the bonding surface of the display body 1 and the bonding surface of the light-transmissive substrate 2, in order to regulate the gap by the thickness of the clearance regulation member 3 after being compression-deformed.

In the present exemplary embodiment, the clearance regulation member 3 includes the non-deformable member 3a and the deformable member 3b laminated together. However, alternatively, the clearance regulation members 3 can include the deformable member 3b only.

The adhesive 4 is applied before setting the display body 1 and the light-transmissive substrate 2 across the clearance regulation member 3 providing a clearance between the bonding surface of the display body 1 and the bonding surface of the light-transmissive substrate 2. In order to prevent adhesive from easily trickling down or running, the adhesive 4 is applied on the bonding surface of the display body 1, which is usually set below the other bonding surface (i.e., the bonding surface of the light-transmissive substrate 2) during the bonding operation. However, alternatively, the adhesive 4 can be applied to the bonding surface of the light-transmissive substrate 2. Furthermore, the adhesive 4 can be applied to the entire bonding surface of the display body 1 or the light-transmissive substrate 2.

However, because the adhesive 4 can be spread as will be described below, the adhesive 4 can be applied at least on one terminal edge of the display body 1 or the light-transmissive substrate 2, from which the pressing starts. If the adhesive 4 is applied on one terminal edge of the display body 1 or the light-transmissive substrate 2, in order to easily spread the adhesive 4 on the entire bonding surface of the display body 1 or the light-transmissive substrate 2, it is useful to apply the adhesive 4 linearly by the length equivalent to the length of one terminal end.

The adhesive 4 can be applied after or before the clearance regulation member 3 is placed and bonded on the substrate.

In the embodiments, the adhesive 4 is not limited to a specific adhesive. In other words, any transparent adhesive, which may not affect the display, can be used as the adhesive 4. More specifically, a thermosetting adhesive, a room temperature setting adhesive, a two-component reaction adhesive, or a UV curable adhesive can be used as the adhesive 4 where necessary.

The viscosity of the adhesive 4 can be selected from the range of 0.1 Pa·s to 10 Pa·s at 25° C. Among various types of transparent adhesives, the UV curable adhesive may be particularly useful because the UV curable adhesive does not apply heat load to the display body 1 and the tact time can be reduced.

In applying the adhesive 4, it is useful to previously defoam the adhesive 4 in a syringe. The deforming of the adhesive 4 can be executed by centrifugal isolation or vacuum deforming. However, if the amount of air contained in the adhesive 4 is sufficiently small, the deforming can be omitted. After executing the defoaming where necessary, the adhesive 4 can be applied by mounting the syringe into a pressure type dispenser (i.e., a constant-amount-of-liquid discharge device).

Subsequently, as illustrated in FIGS. 3D through 3F, the light-transmissive substrate 2 is pressed against the display body 1 on one terminal edge (i.e., on the terminal edge of the light-transmissive substrate 2 on which the adhesive 4 is applied) to compression-deform the clearance regulation members 3 (in the present exemplary embodiment, the deformable members 3b) provided on one terminal edge of the light-transmissive substrate 2.

Then, the clearance regulation members 3 provided on one terminal edge on which the pressure has been applied is compression-deformed. Furthermore, the gap between the bonding surface of the display body 1 and the bonding surface of the light-transmissive substrate 2 on one terminal edge is reduced to spread the adhesive 4 between the bonding surface of the display body 1 and the bonding surface of the light-transmissive substrate 2.

In the present exemplary embodiment, as illustrated in FIG. 3E, the deformable member 3b of the clearance regulation members 3 is compression-deformed to reduce the gap between both bonding surfaces. However, the compression force may not easily be applied to the clearance regulation members 3 provided at locations distant from the position of the pressing operation in the direction of the other terminal edge of the light-transmissive substrate 2.

Accordingly, the clearance regulation members 3 provided at locations distant from the position of the pressing operation in the direction of the other terminal edge of the light-transmissive substrate 2 is not to be compression-deformed and retains the original thickness. Therefore, the clearance between both bonding surfaces around the above-described location can be retained at the thickness substantially equal to the original thickness. Accordingly, the range of the spreading of the adhesive 4 by the above-described pressing can be controlled within a specific range.

As illustrated in FIGS. 4A through 4F, the above-described pressing operation is serially executed starting from one terminal edge to the other terminal edge against the display body 1. In order to easily execute the pressing serially from one terminal edge towards the other terminal edge, a roller 10 can be used in executing the pressing.

By moving the roller 10, which presses the light-transmissive substrate 2 on one terminal edge, towards the other terminal edge while keeping the pressing state thereof, the clearance regulation members 3 (the deformable members 3b) can be serially compression-deformed starting from one terminal edge to the other terminal edge. Alternatively, the display body 1 and the light-transmissive substrate 2, which are stacked sandwiching the clearance regulation members 3 therebetween, can be moved while keeping the pressing state of the roller 10 on the light-transmissive substrate 2.

For the roller 10, in order to uniformly press the light-transmissive substrate 2 for its entire width, it is useful to use a roller having a width equal to or longer than the width of the light-transmissive substrate 2.

At the position of pressing by the roller 10, the deformable member 3b of the clearance regulation members 3 is compression-deformed and the thickness thereof becomes small. In addition, the gap between the bonding surface of the display body 1 and the bonding surface of the light-transmissive substrate 2 is reduced. Therefore, the adhesive 4 is sandwiched between the bonding surface of the display body 1 and the bonding surface of the light-transmissive substrate 2 to be spread along the direction of travel of the roller 10.

When the gap between both bonding surfaces is sequentially reduced, the adhesive 4 is serially spread towards the other terminal edge to be finally spread all over the space between the bonding surface of the display body 1 and the bonding surface of the light-transmissive substrate 2 as illustrated in FIGS. 4D through 4F.

In the present exemplary embodiment, the length of the clearance regulation members 3 is equal to the length of both side edges of the light-transmissive substrate 2. Accordingly, the present exemplary embodiment can effectively prevent running of the adhesive 4 off the light-transmissive substrate 2 from the side edge. By the pressing force from the roller 10, the clearance regulation members 3 can be compression-deformed by a specific amount. Accordingly, the gap between the bonding surface of the display body 1 and the bonding surface of the light-transmissive substrate 2 can be uniform all over the bonding surfaces. In addition, the thickness of the adhesive layer between both bonding surfaces can be controlled to be uniform.

More specifically, the thickness of the clearance regulation member 3 can be set so that the thickness of the clearance regulation member 3 when compression-deformed by the roller 10 to the limit of the deformation thereof may become equivalent to the predetermined thickness of the adhesive layer. Alternatively, according to the relationship between the pressing force from the roller 10 and the thickness of the clearance regulation member 3 (i.e., the deformable member 3b), which is previously examined, the pressing force from the roller 10 can be controlled during the pressing operation by the roller 10 in order to achieve the desired thickness of the adhesive layer.

In order to easily compression-deform the clearance regulation members 3 as the serial pressing is executed, the adhesive 4 can be applied on the shorter side of the display surface of the display body 1 or the light-transmissive substrate 2, which usually have a rectangular shape.

In the embodiments, it is necessary that the clearance regulation members 3, which have been compression-deformed by a necessary amount, remain to be in the compression-deformed state until the adhesive 4, which is sandwiched between both bonding surfaces separated from each other by the predetermined clearance due to the compression-deformation of the clearance regulation members 3, is completely cured. Therefore, for the clearance regulation members 3, it is useful that the deformable member 3b or all of the member is formed by a plastically deformable material or a low-elasticity elastically deformable material. In addition, a plurality of rollers 10 can be used for compression-deformation pressing and restoration-preventing pressing.

If a UV curable adhesive is used as the adhesive 4, the UV lamp 11, which irradiates the adhesive 4 with UV light via the light-transmissive substrate 2, can be relatively moved after the roller 10 to follow the same as illustrated in FIGS. 4A and 4D. With the above-described configuration, after compression-deforming the clearance regulation members 3 using the roller 10, the adhesive 4, which is sandwiched between both bonding surfaces separated from each other by the predetermined clearance due to the compression-deformation of the clearance regulation members 3, can be immediately cured. In addition, elastic restoration of the clearance regulation members 3 can be effectively prevented. The UV lamp 11 and the rollers 10 can be provided as one unit.

Now, bonding processing, which is executed by the display manufacturing method according to a second exemplary embodiment embodiments, will be described in detail below with reference to FIGS. 5A through 5D.

Figure 5A:
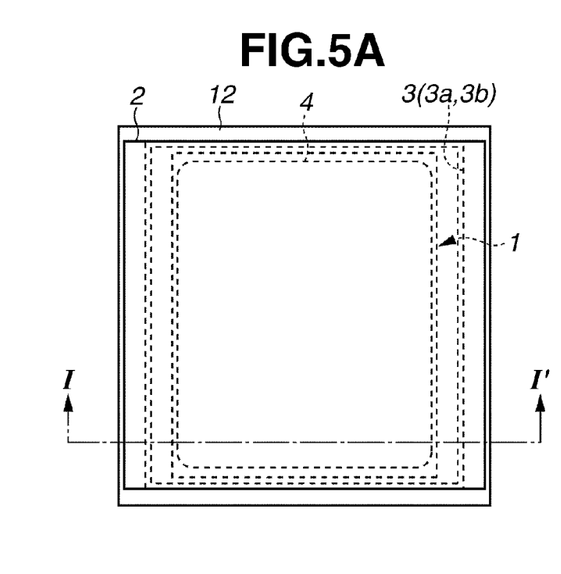
FIGS. 5A through 5D illustrate each processing of bonding processing executed by a display manufacturing method according to a second exemplary embodiment.
Figure 5B:
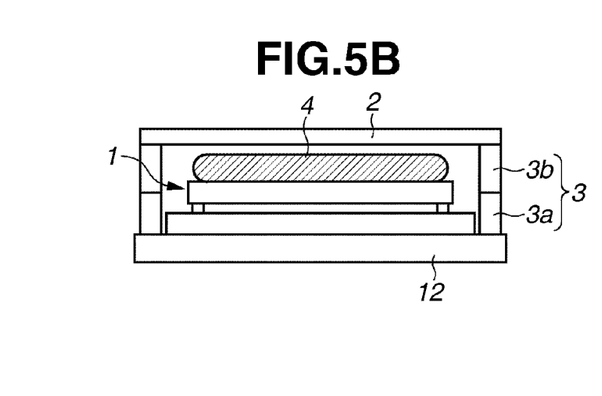
Figure 5C:
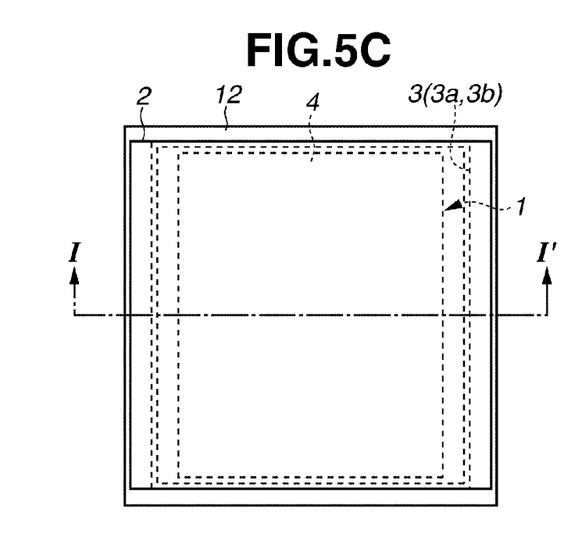
Figure 5D:
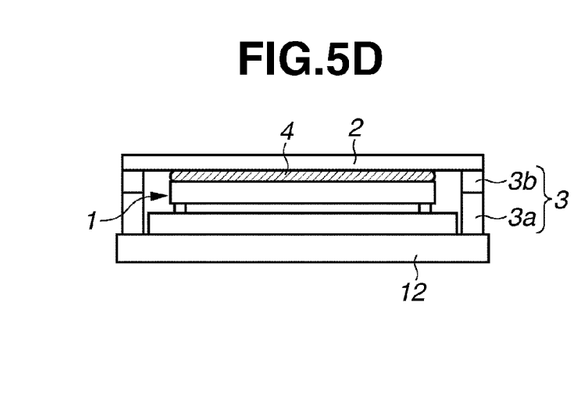

FIG. 5A is a plan view schematically illustrating a state before the pressing is started. FIG. 5B is a schematic cross section I-I' of the example illustrated in FIG. 5A. FIG. 5C is a plan view schematically illustrating a state after the pressing and the curing processing have been completed. FIG. 5D is a schematic cross section I-I' of the example illustrated in FIG. 5C.

In the present exemplary embodiment, the display body 1 is set on a stage 12. In addition, the clearance regulation members 3, each of which can be compression-deformed, are provided between a portion of the stage 12 along an outside of both terminal edges of the display body 1 and both side edges of the light-transmissive substrate 2. With the above-described arrangement, the bonding surface of the display body 1 and the bonding surface of the light-transmissive substrate 2 are opposed to each other with a clearance existing therebetween.

As described above, by serially pressing the light-transmissive substrate 2 from one terminal edge towards the other terminal edge thereof in the state illustrated in FIGS. 5A and 5B, the state is changed to the state illustrated in FIGS. 5C and 5D. The pressing can be implemented by the roller 10 as the first exemplary embodiment.

In the present exemplary embodiment, after the bonding is completed, the clearance regulation member 3 is not left between the bonding surface of the display body 1 and the bonding surface of the light-transmissive substrate 2. If the deformable member 3b is used as the clearance regulation members 3 or if the entire clearance regulation member 3 is made of an elastically deformable material, the clearance regulation member 3 can be used repeatedly.

In addition, in the present exemplary embodiment, the clearance regulation member 3 can be provided at any location on the side edge of the light-transmissive substrate 2 and deviated from the display body 1. In addition, the width of the clearance regulation members 3 can be set within a range wider than that in the first exemplary embodiment.

In addition, in the present exemplary embodiment, the adhesive 4 can also be previously applied only on one terminal edge of the bonding surface of the display body 1 or the bonding surface of the light-transmissive substrate 2. However, in this case, the adhesive 4 may more easily be spread off the bonding surfaces from the side edges of the both bonding surfaces when the adhesive 4 is spread by reducing the clearance between the both bonding surfaces by applying the pressing force. Accordingly, it is useful to apply the adhesive 4 on the substantially entire surface of the bonding surface of the display body 1 or the bonding surface of the light-transmissive substrate 2.

Now, bonding processing, which is executed by the display manufacturing method according to a third exemplary embodiment embodiments, will be described in detail below with reference to FIGS. 6A through 6D.

Figure 6A:
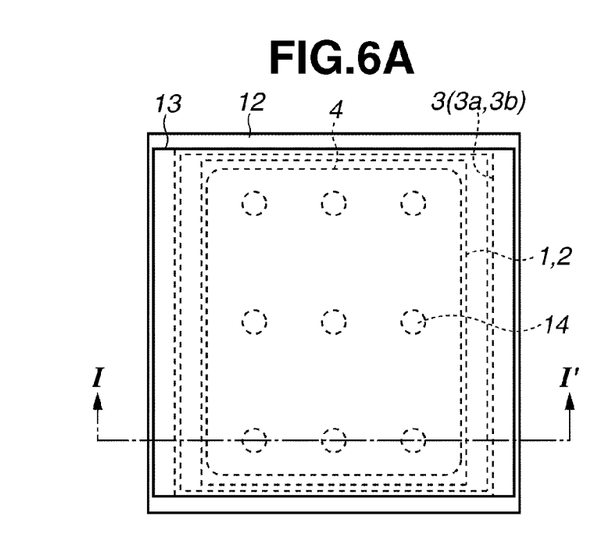
FIGS. 6A through 6D illustrate each processing of bonding processing executed by a display manufacturing method according to a third exemplary embodiment.
Figure 6B:
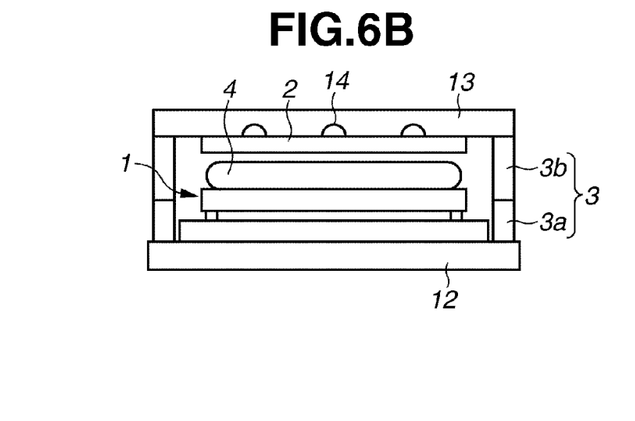
Figure 6C:
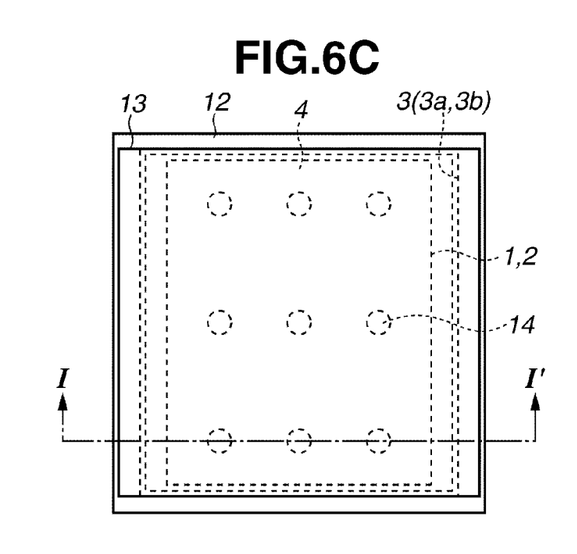
Figure 6D:
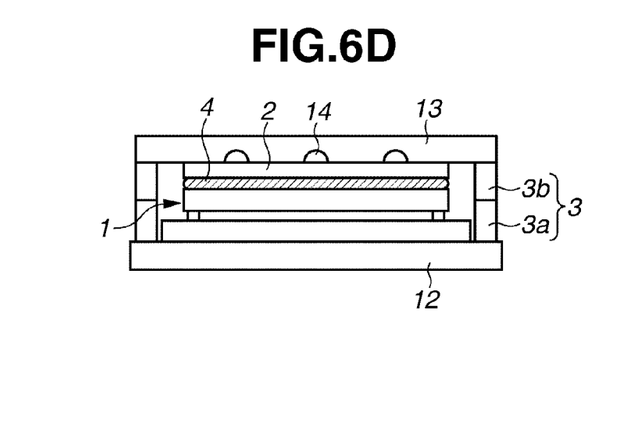

FIG. 6A is a plan view schematically illustrating a state before the pressing is started. FIG. 6B is a schematic cross section I-I' of the example illustrated in FIG. 6A. FIG. 6C is a plan view schematically illustrating a state after the pressing and the curing processing have been completed. FIG. 6D is a schematic cross section I-I' of the example illustrated in FIG. 6C.

The present exemplary embodiment uses retaining member 13, which includes a suction pad 14 and which is capable of suctioning and retaining the light-transmissive substrate 2. As illustrated in FIGS. 6A and 6B, the display body 1 is arranged on the stage 12 and the light-transmissive substrate 2 is retained by the retaining member 13. The suction pad 14 of the retaining member 13 suctions the light-transmissive substrate 2 to retain the light-transmissive substrate 2 onto the retaining member 13.

In the present exemplary embodiment, the clearance regulation members 3, each of which can be compression-deformed, are provided between a portion of the stage 12 along an outside of both terminal edges of the display body 1 and the retaining member 13 provided along an outside of both side edges of the light-transmissive substrate 2. With the above-described arrangement, the bonding surface of the display body 1 and the bonding surface of the light-transmissive substrate 2 are opposed to each other with a clearance existing therebetween.

As described above, by serially pressing the light-transmissive substrate 2 from one terminal edge towards the other terminal edge thereof in the state illustrated in FIGS. 6A and 6B, the state is changed to the state illustrated in FIGS. 6C and 6D. Similar to the first exemplary embodiment, the pressing can be implemented by the roller 10 via the retaining member 13.

Similar to the second exemplary embodiment described above, in the present exemplary embodiment, after the bonding is completed, the clearance regulation member 3 is not left between the bonding surface of the display body 1 and the bonding surface of the light-transmissive substrate 2. If the deformable member 3b is used as the clearance regulation members 3 or if the entire clearance regulation member 3 is made of an elastically deformable material, the clearance regulation member 3 can be used repeatedly.

In the above-described second exemplary embodiment, the size of the light-transmissive substrate 2 is larger than the display surface of the display body 1. On the other hand, the present exemplary embodiment has such an advantage that it is sufficient to prepare the light-transmissive substrate 2 with the same size as the display surface of the display body 1.

Now, a first exemplary example of bonding processing executed by the display manufacturing method will be described below. The inventor executed bonding of the light-transmissive substrate 2 onto the display body 1 by executing the first exemplary embodiment described above with reference to FIGS. 1A and 1B, 2A through 2D, 3A through 3F, and 4A through 4F.

A 2.5 mm-thick soda-lime glass of 700 mm×1,240 mm was prepared as the base of the face plate. On one surface of the soda-lime glass, a black light-shielding member having a plurality of openings in matrix and a phosphor existing in each opening, and an anode electrode covering the surface of the light-shielding member and the phosphor were provided.

In addition, a rear plate was prepared. A soda-lime glass having the same size as the above-described soda-lime glass was used as the base of the rear plate. On one surface of the soda-lime glass, a plurality of wirings provided in the direction of rows and a plurality of wirings provided in the direction of columns, a plurality of field emission type electron emission devices connected to the wirings, and a plurality of spacers are formed to constitute the rear plate. A frame member made of glass was mounted around the periphery of one surface of the rear plate. Fritted glass was provided on the frame member.

In a vacuum ambient atmosphere of $10^{-6}$ Pa, the fritted glass was heated to be melt in the state in which the rear plate and the face plate were retained so that the phosphor and the electron emission device are opposed to each other. Then, the face plate and the frame member were bonded. In this manner, the 8.0 mm-thick panel-like display body 1 was manufactured.

Next, a light-transmissive resin film (an antistatic film) for preventing electric charge was attached onto the outer surface of the display surface of the display body 1. The antistatic film is a PET film including a layer of polyester resin (PET), in which indium tin oxide (ITO) particles are dispersed, on the surface thereof. The size of the antistatic film is substantially the same as the light-transmissive substrate 2, which constitutes the display surface of the display body 1. The antistatic film was attached on the display surface of the display body 1 using an acrylic adhesive.

In the present exemplary embodiment, the light-transmissive substrate 2 includes the soda-lime glass that constitutes the face plate and the light-transmissive resin film for preventing electric charge. The outer surface (the bonding surface) of the light-transmissive substrate 2 is a PET application layer, in which ITO particles are dispersed.

Then, another soda-lime glass having the same size as the display surface of the display body 1 was prepared. On one surface of the soda-lime glass, a light-transmissive resin film for preventing reflection of light was attached. The light-transmissive resin film includes, on the surface of the PET film attached thereto, an acrylic resin layer including silica particles dispersed therein. The size of the light-transmissive resin film is substantially the same as the blue substrate glass to which the film is attached. The PET film was bonded on one surface of the soda-lime glass using an acrylic adhesive.

In the present exemplary embodiment, the light-transmissive substrate 2 includes the soda-lime glass and the light-transmissive resin film for preventing reflection of light. The bonding surface of the light-transmissive substrate 2 is the above-described glass surface.

Then the display surface of the display body 1, onto which the antistatic film had been attached, was washed using an organic solvent, such as alcohol or acetone. After that, a 0.10 mm-thick 1,300 mm (length)×10 mm (width) PET film was provided on each of the side edges of the display surface as the non-deformable member 3a.

The PET film was used because the PET film can hardly affect mechanically and electrically on the display body 1, because a thin film can be easily implemented by the PET film, and because the PET film is inexpensive and advantageous in terms of costs of manufacture.

Subsequently, "Soft Shield 3500" of Taiyo Wire Cloth Co., Ltd., whose size is 1,300 mm (length)×10 mm (width)×5 mm (thickness) and including urethane sponge covered with a nickel-plated film, was provided on the non-deformable member 3a as the deformable member 3b.

Then, as illustrated in FIG. 1A, the adhesive 4 was applied on one terminal edge of the display surface, which is the bonding surface of the display body 1. As the adhesive 4, an acrylic UV curable adhesive having the viscosity of 800 mPa·s, which has the following composition described in Table 1, was used.

Based on the amount to be applied on the entire bonding surfaces of the display body 1 and the light-transmissive substrate 2, the amount of the adhesive 4 to be applied was set at 300 g. Furthermore, the adhesive 4 was applied primarily on the portion corresponding to the portion of the light-transmissive substrate 2 at which the roller 10 contacts the light-transmissive substrate 2 first.

More specifically, in the present exemplary example, the adhesive 4 was applied on the region equivalent to a quarter of the length of the display surface of the display body 1 from one terminal edge to the other terminal edge by the application thickness of about 1.5 mm or less.

TABLE 1

| Component of Adhesive | content (% by weight) |
| --- | --- |
| Hydroxyethyl acrylate | 30 |
| Pentaerythritol triacrylate | 25 |
| Acryl oligomer ("EBECRYL 745" of DAICEL-CYTEC Company LTD.) | 40 |
| 1-Hydroxy-cyclohexyl phenyl ketone | 5 |

Then, the roller 10, which has the length greater than the width of the light-transmissive substrate 2, was caused to contact one terminal edge of the light-transmissive substrate 2, where the adhesive 4 had been applied. Subsequently, the display body 1 and the light-transmissive substrate 2 were integrally moved in the direction in which the other terminal edge thereof reaches a location below the roller 10.

As a result, the deformable member 3b was deformed to reduce its thickness to 0.2 mm from one terminal edge to the other terminal edge. Therefore, in the present exemplary example, the thickness of the adhesive layer was regulated to about 0.30 mm.

The UV lamp 11 was provided at the back of the roller 10. the UV lamp 11 irradiates the adhesive 4 with UV light following the movement of the roller 10 to completely cure the adhesive 4. In the present exemplary example, the light-transmissive substrate 2 was success fully bonded onto the display surface of the display body 1 while controlling the thickness of the adhesive layer within the range of 0.30±0.05 mm with a high accuracy.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-026210 filed Feb. 9, 2010, which is hereby incorporated by reference herein in its entirety.

What is claimed is:

1. A method for manufacturing a display including a light-transmissive substrate bonded onto a display surface of a display body, the method comprising:

setting a bonding surface of the display body and a bonding surface of the light-transmissive substrate in a mutually opposed manner across compression-deformable clearance regulation members, wherein a compression-deformable clearance regulation member is provided between the display body and the light-transmissive substrate on each of both side edges of each of the display body and the light-transmissive substrate with a predetermined clearance; and spreading an adhesive, previously applied to a first terminal edge of at least one of the bonding surface of the display body and the bonding surface of the light-transmissive substrate, between the bonding surfaces of both the display body and the light-transmissive substrate by pressing the light-transmissive substrate against the display body starting from the first terminal edge and moving the pressing towards a second terminal edge thereof to gradually decrease clearance between the bonding surfaces by serially compression-deforming the clearance regulation members from the first terminal edge towards the second terminal edge.

2. The method according to claim 1, wherein each clearance regulation member has a two-layer configuration that includes a non-deformable portion, laminated to a deformable portion in a direction that is same as a direction of subsequent compression-deformation, wherein the non-deformable portion is not compression-deformed in a direction of compression-deformation by a pressing force from the pressing and the deformable portion can be deformed in a direction of compression-deformation by the pressing force from the pressing.

3. The method according to claim 2, wherein the deformable portion is configured to be deformed to a predetermined thickness after a predetermined pressing force from the pressing is applied and, in response to the pressing force increasing beyond the predetermined force at one or more locations between the first terminal edge and the second terminal edge, the deformable portion is not further compression-deformed and a gap between the bonding surfaces of both the display body and the light-transmissive substrate remains constant.

4. The method according to claim 1, wherein each clearance regulation member has a one-layer configuration that includes a deformable portion that can be deformed in a direction of compression-deformation to a predetermined thickness after a predetermined pressing force from the pressing is applied and, in response to the pressing force increasing beyond the predetermined force at one or more locations between the first terminal edge and the second terminal edge, the deformable portion is not further compression-deformed and a gap between the bonding surfaces of both the display body and the light-transmissive substrate remains constant.

5. The method according to claim 1, further comprising positioning the display surface of the display body facing up.

6. The method according to claim 5, further comprising washing the display surface of the display body with an organic solvent.

7. The method according to claim 1, further comprising mounting the light-transmissive substrate onto the display body from above the display body via the clearance regulation members in a state where the bonding surface of the light-transmissive substrate faces down.

8. The method according to claim 7, further comprising, prior to mounting the light-transmissive substrate, bonding the clearance regulation members to the light-transmissive substrate at both side edges thereof.

9. The method according to claim 1, further comprising regulating an electric potential of the display surface of a display body by utilizing a conductive material as a material of the clearance regulation members.

10. The method according to claim 1, wherein providing a compression-deformable clearance regulation member includes providing a plurality of compression-deformable clearance regulation pieces discontiguously along a side edge of one of the display body and the light-transmissive substrate.

11. The method according to claim 1, wherein, to prevent air bubbles being imparted into the adhesive, the predetermined clearance is an amount that prevents the bonding surface of the light-transmissive substrate from contacting the previously applied adhesive immediately after setting the bonding surface of the display body and the bonding surface of the light-transmissive substrate in a mutually opposed manner.

12. The method according to claim 1, further comprising:
defoaming the adhesive prior to applying the adhesive to the first terminal edge.

13. The method according to claim 1, wherein, in response to pressing the light-transmissive substrate against the display body starting from the first terminal edge as a position of a pressing operation, portions of the clearance regulation members provided at the position of the pressing operation compression-deform and portions of the clearance regulation members provided at locations distant from the position of the pressing operation in a direction of the second terminal edge do not compression-deform such that a range of spreading of the adhesive can be controlled within a predetermined range.

14. The method according to claim 13, further comprising:
curing that portion of the adhesive that has passed within the pressing from the pressing operation during the pressing operation and not curing that portion of the adhesive that has not passed within the pressing from the pressing operation.

15. The method according to claim 1, further comprising:
applying restoration-preventing pressing until the adhesive is completely cured.

* * * * *